July 16, 1963     KIYOSHI INOUE     3,098,149

SPARK DISCHARGE MACHINING APPARATUS FOR HARD METALS

Filed June 6, 1960     2 Sheets-Sheet 1

INVENTOR.
KIYOSHI INOUE
BY
Reynolds, Beach & Christensen
ATTORNEYS

CALIBRATED IN DIFFERENT COMBINATIONS OF ELECTRODE AND WORKPIECE METALS

INVENTOR.
KIYOSHI INOUE
BY
Reynolds, Beach & Christensen
ATTORNEYS

United States Patent Office 3,098,149
Patented July 16, 1963

3,098,149
SPARK DISCHARGE MACHINING APPARATUS
FOR HARD METALS
Kiyoshi Inoue, 182 Yoga Tamagawa Setagaya-ku,
Tokyo, Japan
Filed June 6, 1960, Ser. No. 34,187
8 Claims. (Cl. 219—69)

This invention relates to improvements in apparatus for machining by recurrent spark discharges between a metal work piece and an adjacent electrode in a suitable machining fluid. The present invention is concerned broadly with improving the stability, efficiency and quality of machining steel and similar metals of comparable or greater hardness using electrodes of the same or similar metals. The invention is herein illustratively described by reference to the presently preferred embodiments thereof; however, it will be recognized that certain modifications and changes therein with respect to details may be made without departing from the underlying essentials involved.

According to the studies and experiments leading up to the present invention, it was determined that spark discharge machining occurs as a result of several contributing factors. As the spark discharge current traverses the short gap between the electrode and work piece, electron flow is concentrated at the relative high points or prominences occurring between the opposing surfaces and intense heat is developed, causing melting and evaporation of the work surface adiabatically. A high degree of pressure also develops at these localized points due to evaporation of metal and also of the dielectric fluid in which the gap surfaces are immersed. Furthermore, electromagnetic and static forces occur which, when accompanied by the mechanical forces developed, cause expulsion of the melted and evaporated metal. With each spark discharge, mounds and craters are formed on the opposing surfaces, the size, depth and shape of which depend upon several factors, including the work materials used, the energy expended in each discharge (i.e., the capacitance value and charging voltage of the discharge condenser), and others. When these mounds are high, and especially when their rims or ridges lie in registry with each other on the opposing surfaces, interwelding short circuiting of the electrode after a spark discharge becomes a particularly serious problem. Such is the case with steel and comparable hard metals used as both electrode and work piece. Such materials as brass present little problem in this regard.

Under certain circumstances it is desirable to use such hard metals as steel both as the electrode and as the work piece. For example, in order to manufacture precision matching dies for punch presses using spark discharge machining, it is advantageous to form the steel block die by using the preformed steel punch die itself as the machining electrode. These and other useful spark discharge machining applications of steel working against steel, of tungsten carbide working against steel or tungsten carbide, or of other combinations of hard metal, have created an important demand for a solution to the aforementioned problem of aggravated short circuiting between hard metal surfaces, which generally impairs the stability, lowers the efficiency and reduces the rate of speed at which metal is removed from the work piece.

A specific object of this invention, therefore, is to provide a means and technique by which to reduce or substantially eliminate the short-circuiting mounds which are formed on the opposing electrode surfaces by the spark discharge machining impulses, especially in the case of steel and hard metals.

A related spark discharge machining problem to be overcome in the above and other applications is that of high electrode erosion rate. A further object of the invention herein is to provide a means and technique by which electrode erosion may be held at a minimum although machining speed is increased, as by increasing the value of the discharge storage capacitance and by mound removal as accomplished by related means of the invention.

In accordance with this invention in one aspect it has been determined that spark discharge impulse form and duration have a direct bearing on residual crater and mound formations. By adding in the capacitance discharge circuit an impedance which prolongs each discharge, the short-circuiting mounds which occur during the initial or primary portions of each spark discharge period are melted or evaporated during the final portions thereof and short-circuiting tendencies are greatly reduced thereby. Such prolongation of spark discharge is most readily and effectively accomplished by incorporating a series resistance in the discharge circuit which connects the spark gap across the energy storage condenser. Preferably for reasons of machining efficiency this resistance is interposed in a lead common to the charging and discharging circuits of the storage capacitance and is preferably variable as to resistance value. Furthermore, its resistance value is selected to be as small as possible consistent with achieving the described result and minimization of electrode erosion. It so happens that when these conditions are met by appropriate choice of resistance, $I^2R$ energy losses are also acceptably low.

Another feature resides in the provision of a polarity reversing means in a machining circuit having a variable storage capacitance. It is found that electrode erosion rate generally increases as capacitance value is increased, but that the rate of erosion may actually be decreased with further increase of capacitance by reversing the polarity of the source voltage applied to charge the condenser.

These and other features, objects and advantages of the invention will become more fully evident from the following description thereof by reference to the accompanying drawings.

Figure 1:
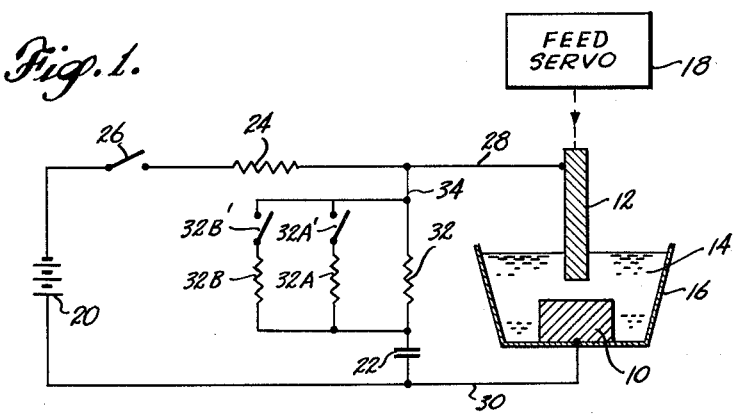
FIGURE 1 is a schematic diagram of the improved machining apparatus in one form.

In FIGURE 1 the work piece 10 and cooperating electrode 12 have mutually opposing surfaces which are immersed in a machining fluid such as a dielectric liquid 14 held within a container 16. A typical machining liquid is kerosene but others may be used. The electrode is fed progressively in relation to the work piece by means of a feed servo 18, details of which are known and are secondary herein. The feed servo maintains the short spark gap distance between the machining surfaces as the work progresses. A discharge machining energy source 20 comprises in this instance a direct-voltage source in the form of a storage battery across opposite terminals of which the storage condenser 22 is connnected. A charging resistance 24 in the charging circuit for storage condenser 22 limits the charging rate so as to permit recovery (deionization) of the spark gap while the condenser charges, and thereby permits acquisition of a full charge without premature discharge by the charge voltage overtaking the reionization potential of the spark gap prematurely. A main switch 26 is incorporated in the charging circuit.

The circuit operates on the principle of a relaxation oscillator. As the condenser 22 acquires charge and its voltage rises, a point is eventually reached at which the spark discharge gap between the electrode 12 and work piece 10 breaks down and current flows through the gap, discharging the condenser. The condenser voltage then drops abruptly until the voltage is no longer sufficient to maintain ionization. Thereupon, current flow substantially ceases and the condenser is recharged from source 20 to repeat the cycle.

Figure 7:
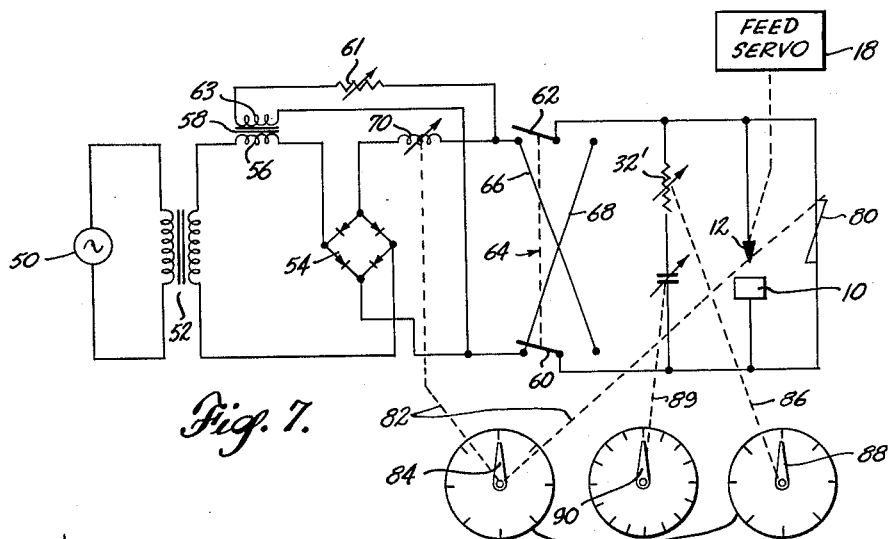
FIGURE 7 is a schematic diagram of another embodiment of the invention including additional refinements.

It will be recognized that means other than the resistance 24 may be used to control the rate at whhich the storage condenser 22 recharges from the source 20. For example, in my issued Patent No. 2,924,751 one refined control system is disclosed wherein the charging circuit incorporates a variable impedance in the form of a variable reactance. One such reactance arrangement is illustrated in FIGURE 7 herein (described below).

The discharge circuit for the storage capacitance 22 includes the conductors 28 and 30 by which the electrode 12 and work piece 10 are connected serially across the capacitance. In accordance with one important aspect of this invention a small resistance 32 is incorporated in the discharging circuit for the purpose of prolonging the discharge period. In this example this resistance is placed in the lead 34 which is connected to the condenser 22 and is common to the charging and discharging circuits. In the illustration the value of resistance is made variable by providing additional shunt resistances 32a and 32b which, by means of switches 32a' and 32b', may be connected selectively into and out of parallel relationship with the resistance 32. The significant effect of such a condenser discharge circuit reactance is to so prolong the condenser discharge as to melt and remove substantially the short-circuiting mounds which are inherently produced by each spark discharge. It is also possible, although with some loss of efficiency, to incorporate such a resistance in one of the leads 28 or 30.

Figure 2:
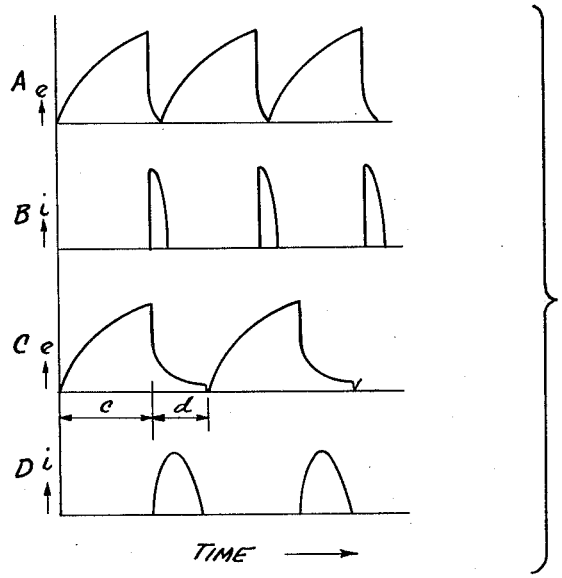
FIGURE 2 is a wave diagram illustrating comparatively the voltage and current impulses in the circuit without the improvement and with the improvement.

As shown in FIGURE 2, without any additional resistance in the discharging circuit, the usual condenser and spark gap voltage appears as in graph A whereas the usual condenser discharge current is shown in graph B. These current impulses are short in relation to the condenser charging period.

In graphs C and D in FIGURE 2 the illustrated voltage and current waves represent operation of the circuit with resistance 32 incorporated in the condenser discharge circuit. In this case, the discharge period $d$ represents a relatively long period of time in comparison with that represented in graphs A and B. In fact, to a first approximation, the discharge period $d$ is made approximately of the same order of magnitude as the charging period $c$. It would perhaps be thought that the effect of prolonging the spark discharge is merely to incur energy loss by $I^2R$ loss in the resistance 32. It is true that a certain small amount of energy is lost in this manner. However, it is possible by proper choice of the value of this resistance to limit the energy loss to acceptable levels and still accomplish the described objective. Heretofore, the principal effort in spark discharge machining has been to produce discharges of very short duration, i.e., less than a millisecond, longer discharges producing arcing effects which are wasteful of energy and damaging to the working surfaces. However, in the present case, for harder metals, limited prolongation effected by a series resistance eliminates short-circuiting difficulties and limits current flow sufficiently to avoid arcing damage despite the longer discharge period.

Figure 3:
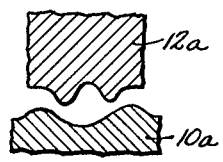
FIGURE 3 is a simplified and greatly enlarged cross-sectional view of adjacent surface portions of the electrode and work piece with one type of electrode material.
Figure 4:
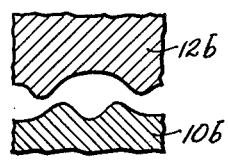
FIGURES 4 and 5 are similar diagrams showing other types of electrodes and work piece materials.
Figure 5:
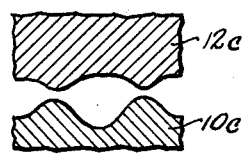

By way of further explanation, it is found that when the discharge impulse is relatively short, most of the craters or pits produced in the electrode and work piece surfaces are produced by volatilization of the metal. However, when the pulses are longer metal is removed and the surfaces are formed principally by a melting process Even during short impulses some of the metal tends to melt toward the latter portion of the impulse period and thus if craters and mounds are formed on the opposing surfaces there is a tendency for the opposing prominences to weld together and form a short circuit. FIGURE 3 illustrates a typical crater and mound formation after one spark discharge in the case of a brass electrode 12a and steel work piece 10a. FIGURE 4 illustrates the crater and mound formations in the case of a silver-tungsten sintered alloy electrode 12b and steel work piece 10b. FIGURE 5 illustrates the formations in the case of a steel electrode and steel work piece. Thus, it will be evident that the crater and mound formations depend directly upon the type of materials used in the work piece and also in the electrode, and that in the case of the steel-to-steel combination (FIGURE 5) not only are the mounds and craters relatively deep but the ridges on the opposing surfaces tend to match up positionally. Thus, because of this greater depth and positional registry, the tendency for short circuiting or welding of the surfaces together, interrupting machining by preventing condenser recharging, is doubly great. With the present invention the short circuiting effect of these mounds is effectively eliminated as previously described.

Figure 6:
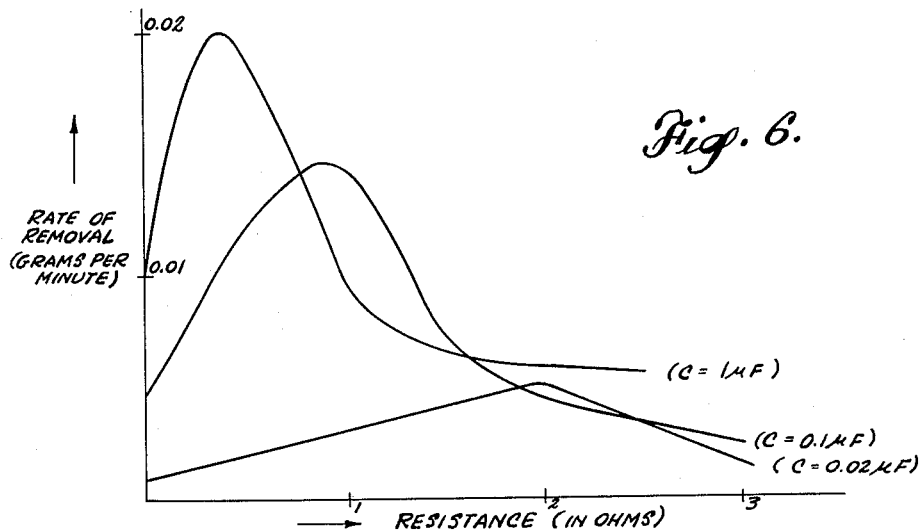
FIGURE 6 is a graph depicting the effect on metal removal rates of changes in the size of the storage capacitance.

FIGURE 6 graphically shows the effect of changing the size of the resistance in the charge-discharge circuit lead 34 for different values of storage condenser 22. In general, it will be observed that for each different value of capacitance there is an optimum value for resistance in order to effect maximum metal removal rates. For the larger values of capacitance the resistance value which produces maximum machining speed is a relatively low resistance value. Fortunately, therefore, energy losses are adjusted to a low value when the circuit is properly adjusted for high machining speed, stability and efficiency by eliminating the mound effect.

The most effective value of resistance 32 in the case of electrodes and work pieces or steel or similar hard metals is determined as follows:

$$R = KC^n$$

where K is within the range between 0.2 and 0.6 and $n$ in the range between 0.4 and 0.5. R is the resistance in ohms and C is the capacitance in microfarads.

In the embodiment shown in FIGURE 7, storage capacitance 22' and discharge resistance 32' are both made variable. Energy is derived from alternating current source 50 connected to input transformer 52. A full-wave rectifier 54 is connected across the secondary of the input transformer through reactance winding 56 of the variable reactor 58. The rectified output voltage is impressed across the series circuit comprising condenser 22' and resistor 32' through the contacts 60 and 62 of the double-pole double-throw switch 64. The latter have cross-connections 66 and 68 with opposite sides of the circuit in order to permit reversal of the polarity of the source voltage applied to the storage condenser 22'. A variable inductance 70 is interposed in one of the charging circuit leads between the rectifier 54 and the condenser 22', outside the lead 34 common to the condenser charging and discharging circuits. The control winding 63 of variable reactance 58 is energized through a variable resistance 61 from the output of the rectifier 54.

As disclosed in my above-cited patent, variable reactance 58 increases the impedance of the energy source circuit in response to a drop of output voltage across rectifier 54 and thereby limits short-circuit current. Moreover, it increases machining speed by accelerating charging of the storage condenser 22' without causing premature breakdown of the spark gap during the condenser charging cycle. Reactance 70 isolates the spark gap electrodes from the inherent capacitance of the rectifier elements in rectifier 54, as is necessary in the event energy storage condenser 22' is small in relation to the capacitance of those elements.

The circuit also preferably includes a nonlinear resistance 80 connected in shunt across the spark discharge gap and operable thereby to prevent abnormal increase of spark discharge voltage. As the spark discharge gap voltage rises above a certain range, the resistance 80 decreases progressively in value and thereby retards the increase. This nonlinear resistance may also be made adjustable as indicated. Through a mechanical connection 82 both the reactance 70 and the nonlinear resistance 80 are jointly varied by means of the dial-calibrated control member 84. This control member may be calibrated in terms of the different combinations of metals used for the electrode and work piece. A similar operating link 86 connects a similarly calibrated control element 88 to the variable resistance 32'. Likewise, the condenser 22' is connected mechanically through a means 89 to a dial-calibrated element 90.

Figure 8:
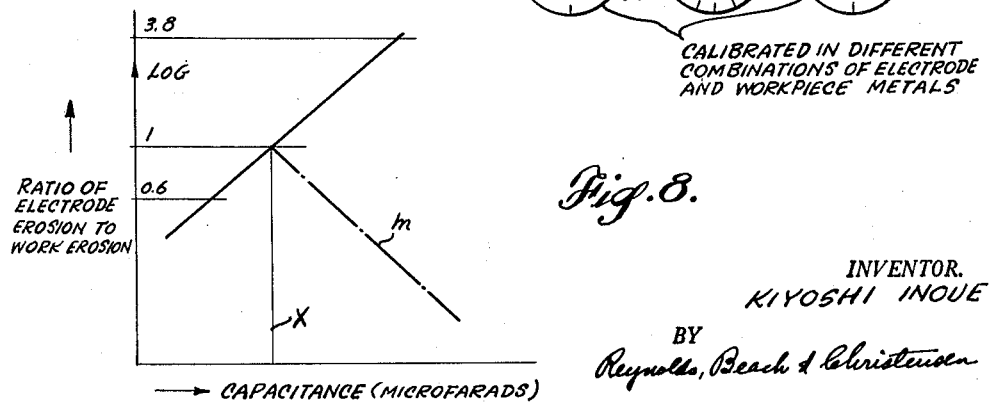
FIGURE 8 is a graph depicting the effect of electrode erosion as a function of storage capacitance value.

As shown in FIGURE 8, the rate of electrode erosion increases progressively as capacitance value is increased until a certain point is reached, such as the point $x$ on the abscissa in the graph, and at this point electrode erosion becomes equal to the rate at which the work piece erosion takes place. If the capacitance is further increased in size, the electrode will erode faster than the work piece. However, by reversing the polarity of the applied voltage a further increase in the storage capacitance decreases the relative rate of electrode erosion, as indicated by the broken line $m$ in the graph. This reversal is effected by means of switch 64. Among various factors influencing electrode erosion the prolongation of discharge pulses effected by the resistance 32 (or 32') is also an influence determining the point at which it is advantageous to reverse the polarity of the applied voltage as capacitance is varied.

These and other aspects of the invention will be evident to those skilled in the art on the basis of the foregoing disclosure of the preferred embodiments.

I claim as my invention:

1. Electric spark discharge machining apparatus including, in combination with a metal work piece, a cooperating electrode establishing a spark discharge gap with said work piece, means immersing the opposing spark discharge surfaces of the electrode and work piece in machining fluid, and means to effect relative feed movement between the electrode and work piece as machining progresses; an energy storage capacitance, a source of energy for charging said capacitance, a charging circuit serially interconnecting said source and capacitance, and a discharging circuit including electrical conductors connecting said electrode and work piece gap across said capacitance, whereby the capacitance intermittently charges from said source and discharges across said gap, said discharging circuit including a series resistance therein prolonging the discharge period of said capacitance just sufficiently thereby to remove substantially the short-circuiting mounds inherently produced by such discharge on the mutually opposing surfaces and which otherwise substantially remain thereon after the discharge without such prolongation of the discharge period.

2. The apparatus defined in claim 1, wherein the two circuits have a common lead connected to the capacitance, and wherein at least a substantial portion of said resistance is interposed serially in said lead.

3. The apparatus defined in claim 1, wherein the two circuits have a common lead connected to the capacitance, and wherein the first-mentioned resistance comprises variable resistance means interposed serially in said lead.

4. The apparatus defined in claim 1, wherein the two circuits have a common lead connected to the capacitance, wherein the first-mentioned resistance comprises variable resistance means interposed serially in said lead, and wherein the capacitance comprises means to vary the capacitance value thereof at will.

5. The apparatus defined in claim 4, and means operable at will to reverse the polarity of the source voltage applied to the capacitance, thereby to permit minimizing the rate of electrode erosion with different values of capacitance selected.

6. The apparatus defined in claim 2, wherein the resistance value (R) of said resistance in ohms is related to the capacitance value (C) of said capacitance in microfarads substantially as follows:

$$R = KC^n$$

wherein K lies substantially within the range between 0.2 and 0.6 and $n$ lies substantially within the range between approximately 0.4 and 0.5, and wherein the electrode and work piece comprise materials at least substantially as hard as steel.

7. Electric spark discharge machining apparatus as defined in claim 1, wherein said charging circuit and delaying recharging of said capacitance after each discharge thereof sufficiently to permit deionization of the gap while the capacitance voltage rises toward the gap breakdown voltage.

8. Electric spark discharge machining apparatus including, in combination with a metal work piece, a cooperating electrode establishing a spark discharge gap with said work piece, means immersing the opposing spark discharge surfaces of the electrode and work piece in machining fluid, and means to effect relative feed movement between the electrode and work piece as machining progresses; an energy storage capacitance means, a source of energy for charging said capacitance means, a charging circuit serially interconnecting said source and capacitance, means to vary the capacitance value of said capacitance means connected serially with said source, a discharging circuit including electrical conductors connecting said electrode and work piece gap across said capacitance, whereby the capacitance intermittently charges from said source and discharges across said gap, and means operable at will to reverse the polarity of the source voltage applied to the capacitance means, thereby to permit minimizing the rate of electrode erosion with different values of capacitance selected.

References Cited in the file of this patent

UNITED STATES PATENTS

| 2,769,078 | Matulaitis | Oct. 30, 1956 |
| 2,895,080 | Branker | July 14, 1959 |
| 2,903,555 | Porterfield | Sept. 8, 1959 |
| 2,951,142 | Ullman | Aug. 30, 1960 |